Aug. 1, 1961  R. R. ZWOLINSKI  2,994,153
SIMULATED VEHICLE CONTROL DEVICE
Filed Oct. 7, 1959  3 Sheets-Sheet 2
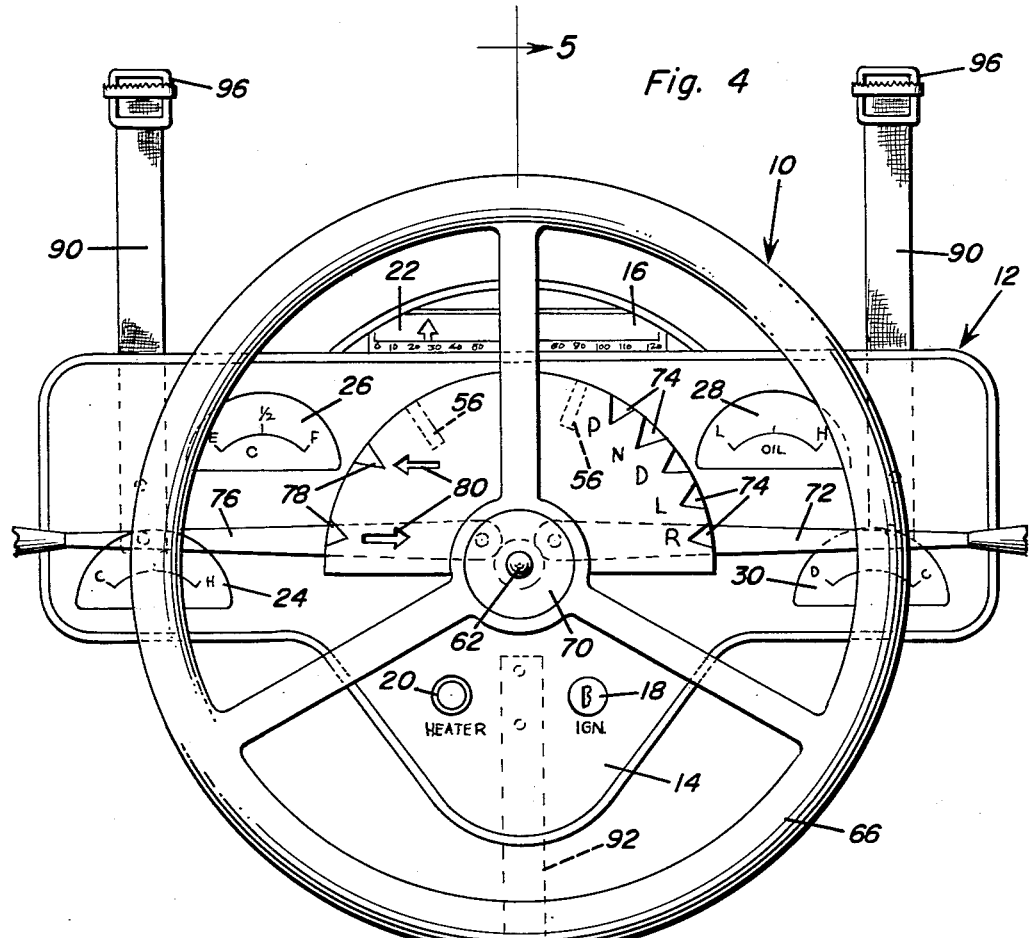
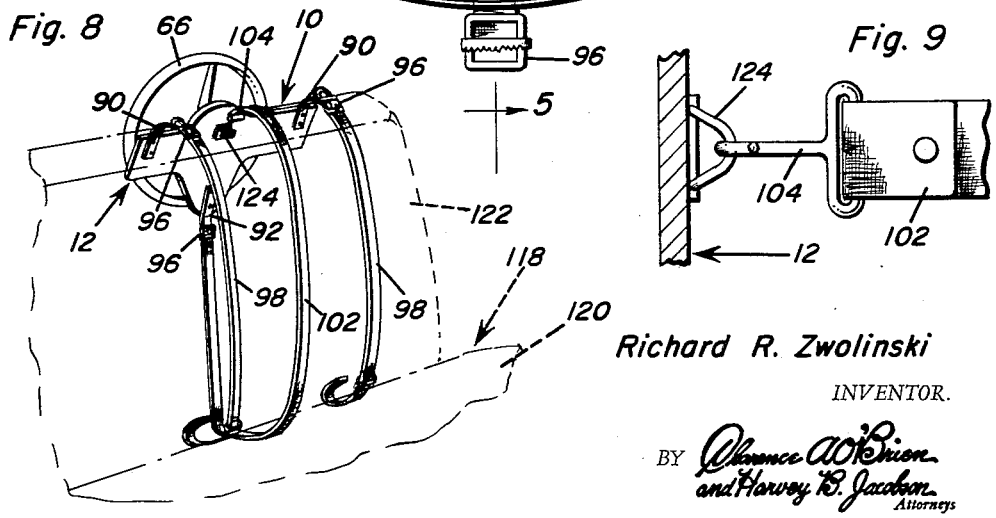
Richard R. Zwolinski
INVENTOR.

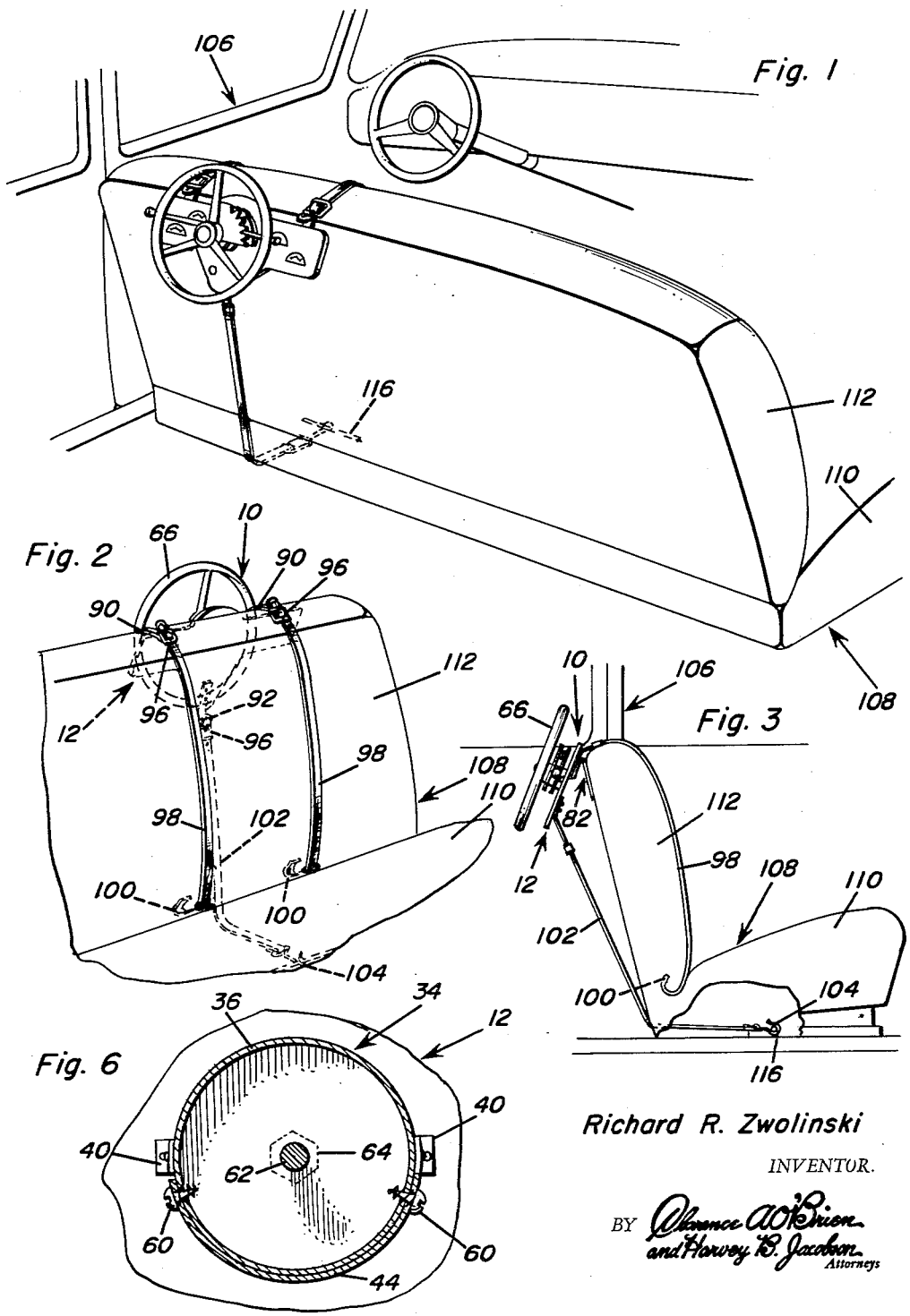

Aug. 1, 1961 R. R. ZWOLINSKI 2,994,153
SIMULATED VEHICLE CONTROL DEVICE
Filed Oct. 7, 1959 3 Sheets-Sheet 3

Richard R. Zwolinski
INVENTOR.

BY *Clarence A. O'Brien*
*and Harvey B. Jackson*
Attorneys

United States Patent Office 2,994,153
Patented Aug. 1, 1961

2,994,153
SIMULATED VEHICLE CONTROL DEVICE
Richard R. Zwolinski, 5244 W. Cornelia St., Chicago, Ill.
Filed Oct. 7, 1959, Ser. No. 844,995
8 Claims. (Cl. 46—1)

This invention relates in general to new and useful improvements in children's toys, and more specifically to a novel simulated vehicle control device.

In the past there has been devised many types of simulated vehicle control devices which are mounted in the vehicle for the purpose of amusing small children while riding in the vehicle. For the most part, the prior devices have major deficiencies. For example, practically all prior devices are constructed for mounting relative to the front seat of the vehicle. When the simulated vehicle control device is so mounted, it is in the way of other persons who normally desire to occupy the front seat of the vehicle. Secondly, by placing the small child in the front seat of the vehicle, the child is disposed closer to the windshield and thus is more likely subject to injury in the event of an accident. Thirdly, the spacing between the instrument panel and the front seat of a vehicle is normally relatively great with the result that the small child cannot reach the simulated vehicle control device if it is mounted on the instrument panel of the vehicle unless, of course, the simulated vehicle control device is provided with a relatively long extension. Fourthly, the vehicle control device is customarily mounted on the wrong side of the vehicle for the small child to simulate the operation of the vehicle.

It is one of the objects of this invention to provide a simulated vehicle control device which may be mounted on the rear of the front seat of a vehicle and to the left side of the vehicle so that the small child utilizing the simulated vehicle control device may be stationed on the same side of the vehicle as the operator thereof, and thus be in a position to properly "control" the operation of the vehicle.

Another object of the invention is to provide a simulated vehicle control device which is provided with mounting means for the mounting thereof on the rear of the vehicle's front seat so that the small child operating the simulated vehicle control device is positioned rearwardly of the driver and a safer distance from the front of the vehicle, thereby greatly reducing the likelihood of injury to the small child, in the event of an accident.

Still another advantage of mounting a vehicle control device to use by small children on the rear of a vehicle front seat is that the vehicle rear seat is disposed much closely adjacent the rear of the front seat than the front seat is with respect to the instrument panel, so that the small child may be seated on the rear seat of the vehicle and still operate the vehicle control device provided for him. A further object of the invention is to provide a novel vehicle control device which is provided with mounting means whereby it may be mounted in the desired position on the rear of a vehicle front seat, the vehicle control device mounting means being of such a nature that it may be mounted on either a two door vehicle or a four door vehicle utilizing the same basic equipment, even though the seat back of the front seat of the two door vehicle pivots to provide access to the rear seat of the vehicle.

Still another object of the invention is to provide a simulated vehicle control device for small children, the control device including a simulated instrument panel which is provided with strap means for mounting the same on the rear of a vehicle front seat, the instrument panel having a steering column extending rearwardly therefrom and a steering wheel being mounted on the steering column for rotation, the steering column being formed in sections separated by a pair of spaced plates and there being mounted between the spaced plates a simulated gear shift lever and a simulated indicator light control lever, whereby a small child operating the simulated vehicle control device may emulate the driver and learn and imitate the steps of operation of the vehicle, except those involving the brake and accelerator pedals.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the interior of a vehicle, as viewed from the rear seat thereof, and shows the vehicle control device, which is the subject of this invention, mounted on the rear of the front seat;

FIGURE 2 is a fragmentary perspective view of the vehicle front seat, as viewed from the front thereof, and shows the simulated vehicle control device mounted thereon;

FIGURE 3 is an elevational view of the front seat of the vehicle taken from within the interior of the vehicle body and shows further the mounting of the simulated vehicle control device thereon;

FIGURE 4 is an enlarged view taken normal to the face of the instrument panel of the simulated vehicle control device and shows the specific details of the simulated vehicle control device;

FIGURE 6 is an enlarged fragmentary sectional view taken substantially upon the plane indicated by the section line 6—6 of FIGURE 5 and shows the manner in which the sections of the simulated steering column are connected together;

FIGURE 8 is a front view of the vehicle control device and shows the strap arrangement for mounting the same on a vehicle front seat of a two-door vehicle, the vehicle front seat being shown in phantom lines; and FIGURE 9 is an enlarged fragmentary sectional view showing the connection between the single strap of the simulated vehicle control device and the instrument panel.

Figure 5:
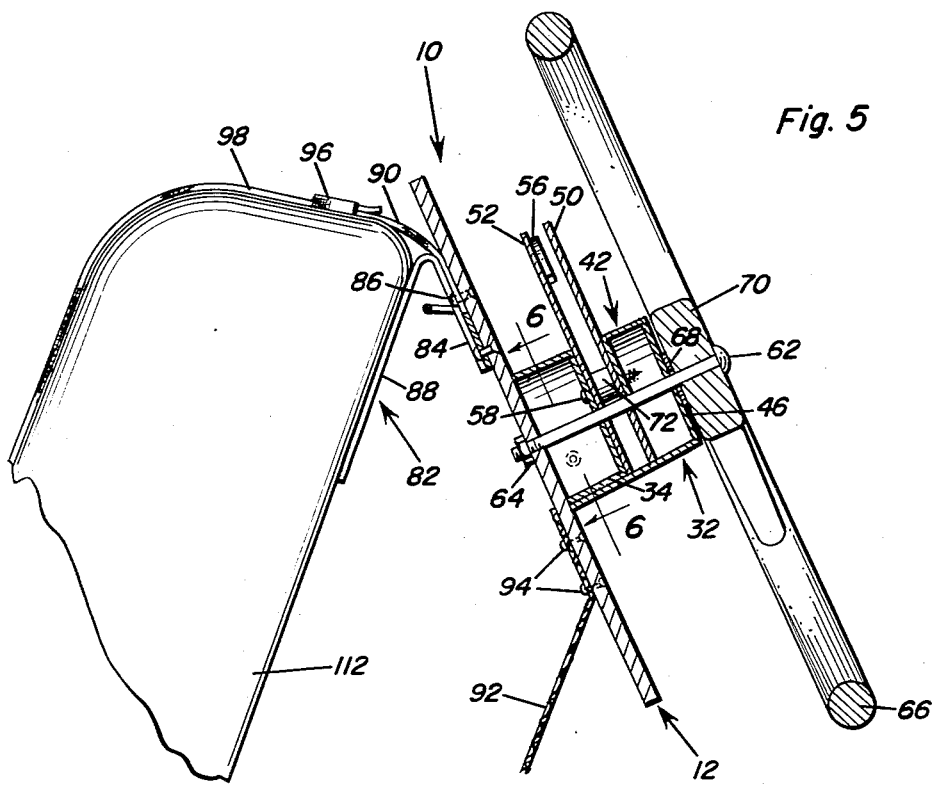
FIGURE 5 is an enlarged fragmentary vertical sectional view taken substantially upon the plane indicated by the section line 5—5 of FIGURE 4 and shows further the specific details of the simulated vehicle control device.
Figure 7:
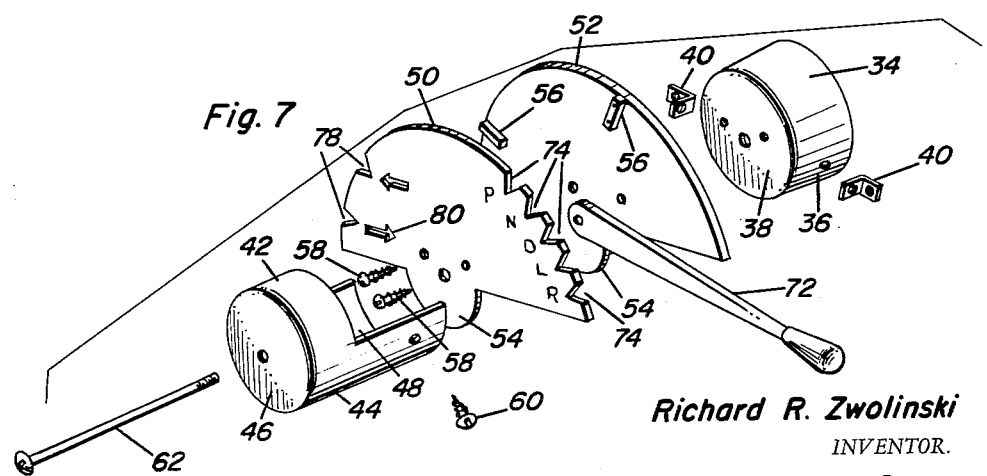
FIGURE 7 is an exploded perspective view showing the details of the steering column and the mounting of the gear shift control lever.

Referring now to the drawings in detail, it will be seen that there are illustrated the details of the simulated vehicle control device, which is the subject of this invention, the simulated vehicle control device being referred to in general by the reference numeral 10. The simulated vehicle control device 10 includes an instrument panel 12, which instrument panel is also simulated and is formed of a relatively large rigid sheet. The simulated instrument panel 12 functions as a main support for all of the companion components of the simulated vehicle control device 10.

The simulated instrument panel 12 may be of any desired configuration and may be formed of any desired materials which have sufficient strength. In the design illustrated, the instrument panel 12 is generally rectangular and elongated horizontally and has a depending lower portion 14 (FIG. 4) and a projecting upper portion 16. The depending lower portion 14 has indicia thereon indicating an ignition switch 18 and a heater control 20. The projecting upper portion 16 has indicia thereon simulating a speedometer 22. The viewable rear surface of the instrument panel 12 is printed or otherwise provided with simulated gauges; namely, a temperature gauge 24, a fuel gauge 26, and oil pressure gauge 28, and an ammeter 30.

A simulated or dummy steering column, generally referred to by the numeral 32, extends rearwardly from the rear face of the simulated instrument panel 12. The steering column 32 is formed in sections and includes a forward section 34 which has a cylindrical body portion 36 and a rear wall 38. The forward steering column section 34 is secured to the rear surface of the instrument panel 12 by means of a pair of diametrically oppositely disposed angle brackets 40, as shown in FIG. 6.

The steering column 32 also includes a rear steering column section 42 which includes an elongated cylindrical body 44 and the rear wall 46. The upper portion of the body 44 is cut-away as at 48 for a purpose to be described in detail hereinafter.

A pair of plates 50 and 52 are disposed intermediate the simulated steering column sections 34 and 42. The plates 50 and 52 are generally semi-circular in outline, although each includes a reduced semi-circular depending portion 54. The plates 50 and 52 are spaced apart by a pair of spacer blocks 56 which are secured to the rear face of the plate 52. A pair of fasteners 58 extend through the plates 50 and 52 and are connected to the rear wall 38 of the steering column section 34. The fasteners 58 are disposed above the center line of the simulated steering column 32.

The semi-circular depending portions 54 of the plates 50 and 52 are received within the steering column section 42 and the forward part of the steering column section 42 telescopes over the steering column section 34. The overlapped portion of the steering column sections 34 and 42 are secured together by fasteners 60, as is best illustrated in FIGURE 6. An elongated bolt 62 extends along the axis of the simulated steering column 32 and passes through the rear wall 46, the plates 50 and 52 and the rear wall 38. A nut 64 (FIGURE 6) is mounted on the forward end of the bolt 62 and abuts the rear wall 38. The bolt 62 serves to mount a steering wheel 66 at the rear end of the simulated steering column 32. This is best illustrated in FIGURE 5. The steering wheel 66 is free to rotate and is spaced from the rear wall 46 by a spacer 68. The steering wheel 66 is also provided with a simulated horn button 70.

A simulated gear shift control lever 72 is pivotally mounted on the right hand one of the fasteners 58 for swinging movement between the adjacent portion of the body 44 and one of the spacer blocks 56. The plate 50 is provided with a plurality of cut-outs 74 with which the simulated gear shift lever 72 may be aligned. The rear surface of the simulated gear shift lever 72 may be painted a desired color which will be viewed through the cut-outs or notches 74. The plate 50 is provided with suitable identifying indicia (capital letters) associated with the notches 74.

A suitable turn indicator light control lever 76 is pivotally mounted on the other of the fasteners 58 for swinging movement between the other of the spacer blocks 56 and the projecting portion of the body 44. A pair of notches 78 are cut in the left part of the plate 50 to facilitate the positioning of the lever 76. If desired, the plate 50 may also be provided with arrow-shaped cut-outs 80 with which the lever 76 may be aligned. The rear surface of the lever 76 will also be painted a suitable color which may be viewed either through the notches 78 or through the cut-outs 80.

In order to facilitate the proper mounting of the simulated vehicle control device on the rear of a vehicle's front seat, the forward surface of the simulated instrument panel 12 is provided with a pair of widely spaced braces 82 which are secured to the forward facing side of the upper half portion of the instrument panel 12. The braces 82 include a rear leg 84 which is secured to the simulated instrument panel 12 by rivets 86, and a forward leg 88, the individual brace being of a generally inverted V-shaped outline, as is best illustrated in FIGURE 5.

The leg 84 and the rivets 86 securing the braces 82 to the simulated instrument panel 12 also serve to secure a pair of straps 90 to the forward surface of the instrument panel 12. A single centrally located strap 92 is secured to the lower central portion 14 of the instrument panel 12 by means of rivets 94. As is best illustrated in FIGURE 4, the straps 90 and 92 are relatively short and are provided with buckles 96.

Reference is now made to FIGURES 1, 2 and 3 of the drawings. The straps 90 are provided with extensions 98 which are connected to the buckles 96 thereof in adjusted positions. The extensions 98 are provided at their opposite ends with hooks 100. The strap 92 is also provided with an extension 102 which is adjustably connected to the strap 92 by means of its buckle 96. Extension 102 is provided with a hook 104 at the opposite end thereof.

The vehicle in which the simulated vehicle control device 10 is mounted is generally referred to by the numeral 106. When the vehicle 106 is of the four door type, it will include a vehicle front seat, generally referred to by the numeral 108. The vehicle front seat 108 includes a seat portion 110 and a back rest 112. The back rest 112 is provided at the bottom thereof with a depending lip which extends transversely of the vehicle. Also, the vehicle front seat 108 will include a rod 116 which, for example, may be the rod which extends between the vehicle seat and serves to adjustably position the vehicle seat. When the simulated vehicle control device is mounted on the vehicle front seat 108, the strap extensions 98 pass over and down the front portion of the backrest 112 and are anchored to the bottom forward lip of the backrest 112. The strap extension 102 extends down rearwardly of the backrest 112 and the hook 104 thereof is anchored on the rod 116. Since the straps 90 and 92 and the strap extensions 98 and 102 are formed of relatively soft material, it will be readily apparent that the mounting of the simulated vehicle control device 10 would in no way damage the vehicle seat.

The mounting of the simulated vehicle control device 10 in a two-door vehicle presents a slightly different problem. In FIGURE 8 there is illustrated the vehicle front seat of a two-door vehicle, the front seat being generally referred to by the numeral 118. The front seat 118 includes a lower seat portion 120 and an upstanding backrest 122. Actually the vehicle front seat 118 is provided with two separate backrests 122 which are hingedly mounted with respect to the seat portion 120 to facilitate access to the vehicle rear seat. Since the backrest 122 will pivot, the single strap extension 102 cannot be anchored to the rod 116. Accordingly, while the strap extensions 98 will be anchored to the rod 114 in the normal manner, it is necessary that the strap extension 102 be of a sufficient length to pass beneath the backrest 122 and up and around the backrest 122 and terminate forwardly of the simulated instrument panel 12. The central portion of the instrument panel 12 is provided with an eye 124. The hook 104 on the strap extension 102 is connected to the eye 124. In this manner the simulated vehicle control device 10 is mounted on the backrest 122 for pivotal movement therewith.

The advantages of the simulated vehicle control device 10 are obvious ones. First, it is mounted on the back of the vehicle front seat in a position where it is out-of-the-way of other occupants of the front seat. Secondly, it is properly spaced with respect to the vehicle rear seat to permit a child to be seated on the vehicle rear seat and to still operate the simulated vehicle control device. Further, it may be mounted on the left side of the vehicle to more accurately simulate the controlling of a vehicle. In addition to this, the child is in the rear seat where he does not interfere with the operation of the vehicle and is out of the way in the event of an accident.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A simulated vehicle control device for children comprising a rigid readily attachable and detachable simulated instrument panel, a dummy steering wheel, imitation column means carried by said instrument panel mounting said steering wheel in a rearwardly spaced position and for rotation, and means connected to said instrument panel for mounting said instrument panel on the rear of a vehicle front seat and in an accessible position relative to a vehicle rear seat, said instrument panel mounting means including a pair of flexible adjustable straps adapted to pass forwardly and down around the front portion of a vehicle front seat bracket and be anchored to said vehicle front seat back, and a third flexible strap adapted to be passed rearwardly of a vehicle front seat back and be anchored to a vehicle front seat.

2. A simulated vehicle control device for children, said control device comprising a simulated instrument panel, a steering wheel, means carried by said instrument panel mounting said steering wheel in a rearwardly displaced position and for rotation, and means connected to said instrument panel for mounting said instrument panel on the rear of a vehicle front seat and in an accessible position relative to a vehicle rear seat, said instrument panel mounting means including a pair of duplicate flexible straps spaced apart and adapted to pass forwardly and down around the front portion of a vehicle front seat back and be anchored to said vehicle front seat back, and a single strap adapted to be passed rearwardly of and then up and around a vehicle front seat back, and hook means on the free anchorable end of said single strap adapted for interlocking engagement with said instrument panel.

3. A simulated vehicle control device for children, said control device comprising a simulated instrument panel, a steering wheel, means carried by said instrument panel mounting said steering wheel in a rearwardly displaced position and for rotation, and means connected to said instrument panel for mounting said instrument panel on the rear of a vehicle front seat and in an accessible position relative to a vehicle rear seat, said instrument panel mounting means including a pair of inverted V-shaped braces secured to said instrument panel and projecting forwardly therefrom for support and stabilizing contact with the back of a vehicle front seat for retaining said instrument panel at the desired easy-viewing angle.

4. A simulated vehicle control device for children, said control device comprising a simulated instrument panel, a steering wheel, means carried by said instrument panel mounting said steering wheel in a rearwardly displaced position and for rotation, and means connected to said instrument panel for mounting said instrument panel on the rear of a vehicle front seat and in an accessible position relative to a vehicle rear seat, said instrument panel mounting means including a pair of spaced apart front straps adapted to pass forwardly and down around the front portion of a vehicle front seat back in general parallelism and be anchored to said vehicle front seat back, and a single rear strap adapted to occupy a position between the front straps and be passed rearwardly of the back vertical surface of said front seat, a pair of left and right braces secured to said instrument panel and projecting forwardly therefrom for stabilized engagement with the back of said front seat for retaining said instrument panel at the desired angle, said braces being aligned with the respective left and right straps of said pair of straps.

5. A simulated vehicle control device for children, said control device comprising a simulated instrument panel, a steering wheel, means carried by said instrument panel mounting said steering wheel in a rearwardly displaced position and for rotation, said steering wheel mounting means including a simulated steering column, and a simulated gear shift lever and simulated directional light control lever carried by said steering column intermediate said steering wheel and said instrument panel, said steering column comprising alined companion sections bolted together but separated by a pair of spaced semi-circular plates, and said levers having inner end portions pivotally mounted between said plates.

6. A simulated vehicle control device for children, said control device comprising a simulated instrument panel, a steering wheel, means carried by said instrument panel mounting said steering wheel in a rearwardly displaced position and for rotation, said steering wheel mounting means including a simulated steering column, and a simulated gear shift lever and simulated directional light control lever carried by said steering column intermediate said steering wheel and said instrument panel, said steering column being formed in sections separated by a pair of spaced plates, said levers being mounted between said plates, one of said steering column sections having an extension extending across bottom edge portions of said plates and being telescoped over a peripheral portion of the other of said sections.

7. A simulated vehicle control device for children, said control device comprising a simulated instrument panel, an imitation steering wheel, spacing and mounting means carried by said instrument panel and mounting said steering wheel in a rearwardly displaced position and for rotation, said steering wheel spacing and mounting means including a simulated steering wheel column, a simulated gear shift lever, a simulated directional light control lever, said levers carried by said steering column intermediate said steering wheel and said instrument panel, said steering column being formed in sections separated by a pair of opposed spaced parallel plates, said levers having end portions mounted in between said plates, and indicating means on one of said plates cooperable with said levers for designating the drive, reverse, neutral and other "operating" positions of said levers.

8. For use by a child, a toy-type attachment for the rear upper portion of the back of a front seat preferably directly in back of the driver, simulated vehicle control means comprising, in combination, a dummy instrument panel having a rear side provided with painted gauges imitative of gauges commonly present on vehicle instrument panels, spaced inverted V-shaped adapter and stabilizing brackets affixed to an upper forward portion of said panel and adapted to rest simultaneously and forwardly against the back side of the backrest of the vehicle front seat, adjustable strap means cooperable with said panel and braces and adapted to assist in positioning and retaining the panel in its intended position, a simulated steering column embodying aligned companion sections separated by opposed spaced parallel plates, a bolt passing through the sections and plates and fastened on said panel with a steering wheel mounted for rotation on an end portion of the bolt and resting against an adjacent section of the simulated steering column, a simulated gear shift lever pivotally mounted between the plates at a right hand side of the plates, and a simulated directional light control lever also pivotally mounted between the plates at the left hand side of said plates.

References Cited in the file of this patent

UNITED STATES PATENTS 2,522,205    Anderson    Sept. 12, 1950
2,733,543    Knight    Feb. 7, 1956

OTHER REFERENCES

"Playthings" for March 1948, page 267 cited.